(12) United States Patent
Lai

(10) Patent No.: US 8,035,251 B2
(45) Date of Patent: Oct. 11, 2011

(54) UNINTERRUPTIBLE POWER SUPPLY

(75) Inventor: Yuan-Fang Lai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 186 days.

(21) Appl. No.: 12/563,220

(22) Filed: Sep. 21, 2009

(65) Prior Publication Data

US 2010/0133910 A1 Jun. 3, 2010

(30) Foreign Application Priority Data

Dec. 1, 2008 (TW) .............................. 97146671 A

(51) Int. Cl.
*H02J 7/00* (2006.01)
*H02J 9/00* (2006.01)

(52) U.S. Cl. ............................... 307/66; 307/46

(58) Field of Classification Search .................. 307/43, 307/44, 45, 46, 64, 66, 80, 85
See application file for complete search history.

(56) References Cited

U.S. PATENT DOCUMENTS 6,201,371 B1 * 3/2001 Kawabe et al. ............... 320/121

* cited by examiner

*Primary Examiner* — Jared Fureman
*Assistant Examiner* — Carlos Amaya
(74) *Attorney, Agent, or Firm* — Kirton & McConkie; Evan R. Witt

(57) ABSTRACT

An uninterruptible power supply includes an input switching circuit, an AC-to-DC converting circuit, a bus capacitor, an energy storage unit, a charging circuit, a DC-to-DC converting circuit, and a system control circuit. The input switching circuit receives an input AC voltage. The AC-to-DC converting circuit is used for converting the input AC voltage into a bus voltage. The energy storage unit is used for storing electric energy. The charging circuit is used for charging the energy storage unit. The DC-to-DC converting circuit is used for converting the energy storage unit connecting node voltage into a regulated DC voltage. The system control circuit is used for controlling operations of the uninterruptible power supply. When the uninterruptible power supply is initiated, the AC-to-DC converting circuit is disabled and the bus capacitor is charged by the DC-to-DC converting circuit under control of the system control circuit.

20 Claims, 10 Drawing Sheets

UNINTERRUPTIBLE POWER SUPPLY

FIELD OF THE INVENTION

The present invention relates to a power supply, and more particularly to an uninterruptible power supply (UPS).

BACKGROUND OF THE INVENTION

With increasing development of information industries and high-tech industries, most precise electronic instruments and facilities need highly reliable power to maintain normal operations. Generally, an uninterruptible power supply (UPS) are widely used to provide stable power to the loads that are connected with. In other words, UPS apparatuses become essential for supplying stable power.

The conventional uninterruptible power supply principally includes an AC-to-DC converting circuit, a DC-to-AC converting circuit and a bus capacitor. The output terminal of the AC-to-DC converting circuit is connected to the bus capacitor and the input terminal of the DC-to-DC converting circuit. By the AC-to-DC converting circuit, an AC input voltage is converted into a regulated DC voltage and a bus voltage is generated to the DC bus. The bus capacitor is connected to the DC bus for filtering off undesirable noise contained in the bus voltage, thereby providing a constant bus voltage. By the DC-to-AC converting circuit, the constant bus voltage is converted into an output AC voltage required for powering a load.

That is, if the input AC voltage is suffered from a sudden variation or interruption, the uninterruptible power supply apparatus can still generate a stable and uninterruptible output AC voltage to the load and thus a high-quality output AC voltage is continuously transmitted to the load.

Moreover, since the amount of electric energy outputted from the AC-to-DC converting circuit and the duty cycle of the internal switching circuit are adjusted, the output voltage of the AC-to-DC converting circuit (i.e. the bus voltage) can be maintained at the rated voltage value.

When the conventional uninterruptible power supply is initiated or enabled, the voltage across the bus capacitor and the electric energy stored in the bus capacitor are zero. As a consequence, the voltage difference between the bus voltage and the rated voltage value is very huge and internal switching circuit is adjusted to be operated at the maximum duty cycle. At the same time, the AC-to-DC converting circuit generates a very huge current to charge the bus capacitor. Since a huge initiation current is generated in the input side of the uninterruptible power supply, an inrush current is ready generated.

For preventing the uninterruptible power supply from being burnt out, the input side of the uninterruptible power supply is usually connected to a NTC (negative temperature coefficient) thermistor in series. Due to the inherent property of the thermistor, the initiation current generated when the uninterruptible power supply is initiated will be reduced. In some cases, a phase-adjusting circuit including a silicon-controlled rectifier (SCR) is connected to the input side of the uninterruptible power supply. The phase-adjusting circuit is controlled by a phase control circuit. As a consequence, the input AC voltage with certain phases can be transmitted to the AC-to-DC converting circuit through the phase-adjusting circuit to reduce the initiation current.

Although the thermistor is effective for reducing the initiation current, there are still some drawbacks. For example, the thermistor may consume additional power and thus the overall efficiency of the uninterruptible power supply is decreased. Moreover, the resistance value of the thermistor needs to be adjusted according to the capacitance value of the bus capacitor. Since there is a large error between the practical capacitance value and the labeling capacitance value of the bus capacitor, the resistance value of the thermistor is usually undesired. Under this circumstance, the efficacy of using the thermistor to reduce the initiation current is insufficient.

Moreover, the phase-adjusting circuit can only adjust the phase of the input AC voltage to be transmitted to the AC-to-DC converting circuit. The phase-adjusting circuit, however, fails to adjust the magnitude of current during the on phase period. As known, the magnitude of current generated during the on phase period is varied depending on the magnitude of the input AC voltage. After the silicon-controlled rectifier of the phase-adjusting circuit is conducted, the silicon-controlled rectifier of the phase-adjusting circuit fails to be shut off under control of the phase control circuit and thus the initiation current can not be accurately reduced. Since the phase control circuit is very complicated, the stability of the phase control circuit is usually insufficient. In other words, the overall stability of the uninterruptible power supply is unsatisfactory.

Therefore, there is a need of providing an improved uninterruptible power supply to obviate the drawbacks encountered from the prior art.

SUMMARY OF THE INVENTION

An object of the present invention provides an uninterruptible power supply for dynamically adjusting a rated voltage value of the regulated DC voltage issued from the DC-to-DC converting circuit when the uninterruptible power supply is initiated, thereby reducing the initiation current and preventing from the inrush current.

An object of the present invention provides an uninterruptible power supply having low power consumption, simplified control circuit and enhanced overall stability without the need of the phase control circuit and the thermistor.

In accordance with an aspect of the present invention, there is provided an uninterruptible power supply. The uninterruptible power supply includes an input switching circuit, an AC-to-DC converting circuit, a bus capacitor, an energy storage unit, a charging circuit, a DC-to-DC converting circuit, and a system control circuit. The input switching circuit receives an input AC voltage. The AC-to-DC converting circuit is interconnected between the input switching circuit and a DC bus for converting the input AC voltage into a bus voltage. The bus capacitor is connected to the DC bus. The energy storage unit has an end selectively connected to an energy storage unit connecting node and the other end connected to a common terminal for storing electric energy. The charging circuit is connected to the input switching circuit and the energy storage unit connecting node for charging the energy storage unit. The DC-to-DC converting circuit is connected to the energy storage unit connecting node and the DC bus for converting the energy storage unit connecting node voltage into a regulated DC voltage. The system control circuit is connected to the input switching circuit, the AC-to-DC converting circuit, the charging circuit and the DC-to-DC converting circuit for controlling operations of the uninterruptible power supply. When the uninterruptible power supply is initiated, the AC-to-DC converting circuit is disabled and the bus capacitor is charged by the DC-to-DC converting circuit under control of the system control circuit.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
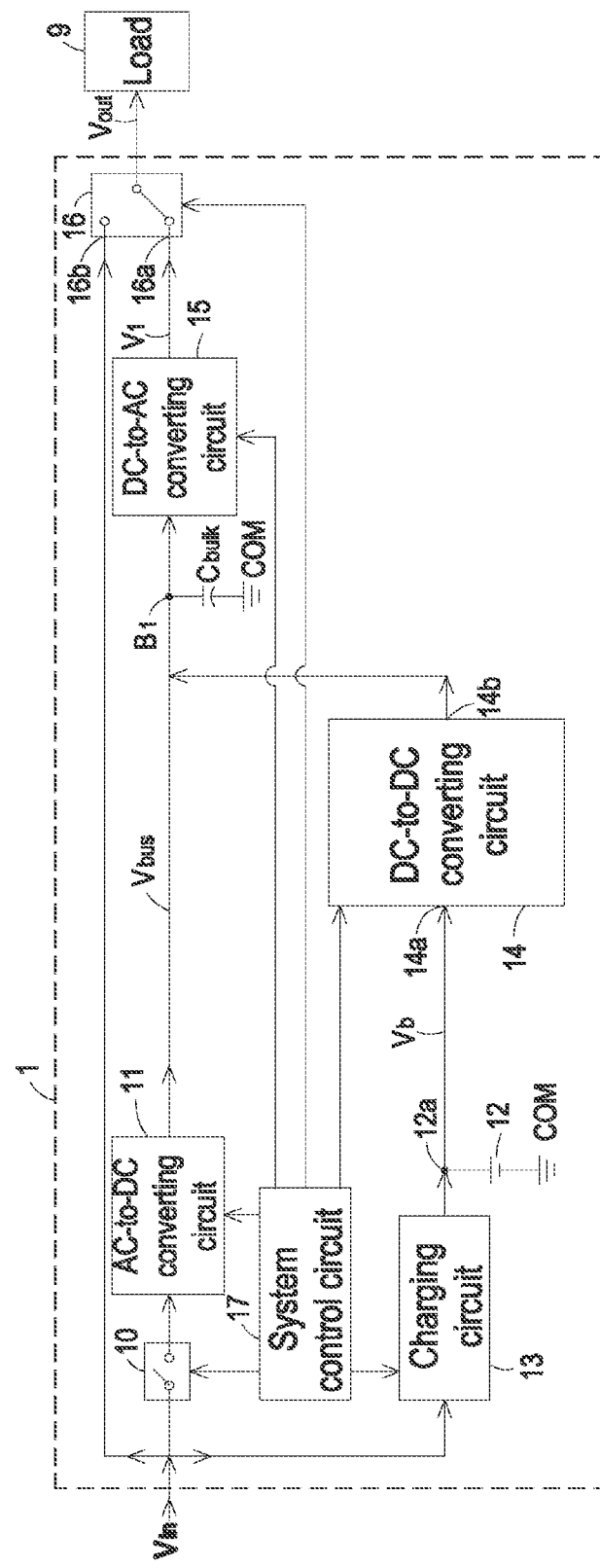
FIG. 1 is a schematic circuit diagram of an uninterruptible power supply according to a first preferred embodiment of the present invention.

FIG. 1 is a schematic circuit diagram of an uninterruptible power supply according to a first preferred embodiment of the present invention. By the uninterruptible power supply apparatus 1, an input AC voltage $V_{in}$ is converted into a stable and uninterruptible output AC voltage $V_{out}$ for powering a load 9. Moreover, if the input AC voltage $V_{in}$ is suffered from a sudden variation or interruption, the uninterruptible power supply apparatus 1 can still generate a stable and uninterruptible output AC voltage $V_{out}$ to the load 9. As shown in FIG. 1, the uninterruptible power supply apparatus 1 principally comprises an input switching circuit 10, an AC-to-DC converting circuit 11, a bus capacitor $C_{bulk}$, an energy storage unit 12, a charging circuit 13, a DC-to-DC converting circuit 14, a DC-to-AC converting circuit 15, a selection circuit 16 and a system control circuit 17. The input switching circuit 10 is connected to the input terminal of the AC-to-DC converting circuit 11. The input switching circuit 10 is conducted or shut off under the control of the system control circuit 17. By controlling the on/off statuses of the input switching circuit 10, the input AC voltage $V_{in}$ is transmitted to the AC-to-DC converting circuit 11 through the input switching circuit 10 or fails to be transmitted to the AC-to-DC converting circuit 11.

The input terminal of the AC-to-DC converting circuit 11 is connected to the input switching circuit 10. The output terminal of the AC-to-DC converting circuit 11 is connected to the DC bus $B_1$. By the AC-to-DC converting circuit 11, the input AC voltage $V_{in}$ is converted into a bus voltage $V_{bus}$. The bus capacitor $C_{bulk}$ is interconnected between the DC bus $B_1$ and a common terminal COM for filtering off undesirable noise contained in the bus voltage $V_{bus}$, thereby providing a constant bus voltage $V_{bus}$.

The positive end of the energy storage unit 12 is selectively connected to the energy storage unit connecting node 12a. The negative end of the energy storage unit 12 is connected to the common terminal COM. The energy storage unit 12 is used for storing electric energy. If the input AC voltage $V_{in}$ is suffered from a sudden variation or interruption, the energy storage unit 12 will provide electric energy to the load 9. In some embodiments, the energy storage unit 12 may be disconnected from the energy storage unit connecting node 12a. The input terminal of the charging circuit 13 is connected to the input terminal of the input switching circuit 10. The output terminal of the charging circuit 13 is connected to the energy storage unit connecting node 12a. By the charging circuit 13, the input AC voltage $V_{in}$ is converted into an energy storage unit connecting node voltage $V_b$ required for charging the energy storage unit 12 through the energy storage unit connecting node 12a.

The power input terminal 14a of the DC-to-DC converting circuit 14 is connected to the energy storage unit connecting node 12a. The power output terminal 14b of the DC-to-DC converting circuit 14 is connected to the DC bus $B_1$. By the DC-to-DC converting circuit 14, the energy storage unit connecting node voltage $V_b$ is converted into a regulated DC voltage equal to the bus voltage $V_{bus}$. The input terminal of the DC-to-AC converting circuit 15 is connected to the DC bus $B_1$. The output terminal of the DC-to-AC converting circuit 15 is connected to a first input terminal 16a of the selection circuit 16. By the DC-to-AC converting circuit 15, the bus voltage $V_{bus}$ is converted into a first AC voltage $V_1$.

The first input terminal 16a, the second input terminal 16b and the output terminal of the selection circuit 16 are connected to the output terminal of the DC-to-AC converting circuit 15, the input terminal of the input switching circuit 10 and the load 9, respectively. Under control of the system control circuit 17, the selection circuit 16 will selectively output the first AC voltage $V_1$ to the load 9 through the first input terminal 16a or output the input AC voltage $V_{in}$ to the load 9 through the second input terminal 16b. Alternatively, the system control circuit 17 may control the selection circuit 16 to interrupt provision of electric energy to the load 9. The system control circuit 17 is connected to the input switching circuit 10, the AC-to-DC converting circuit 11, the charging circuit 13, the DC-to-DC converting circuit 14, the DC-to-AC converting circuit 15 and the control terminals of the selection circuit 16.

Figure 2:
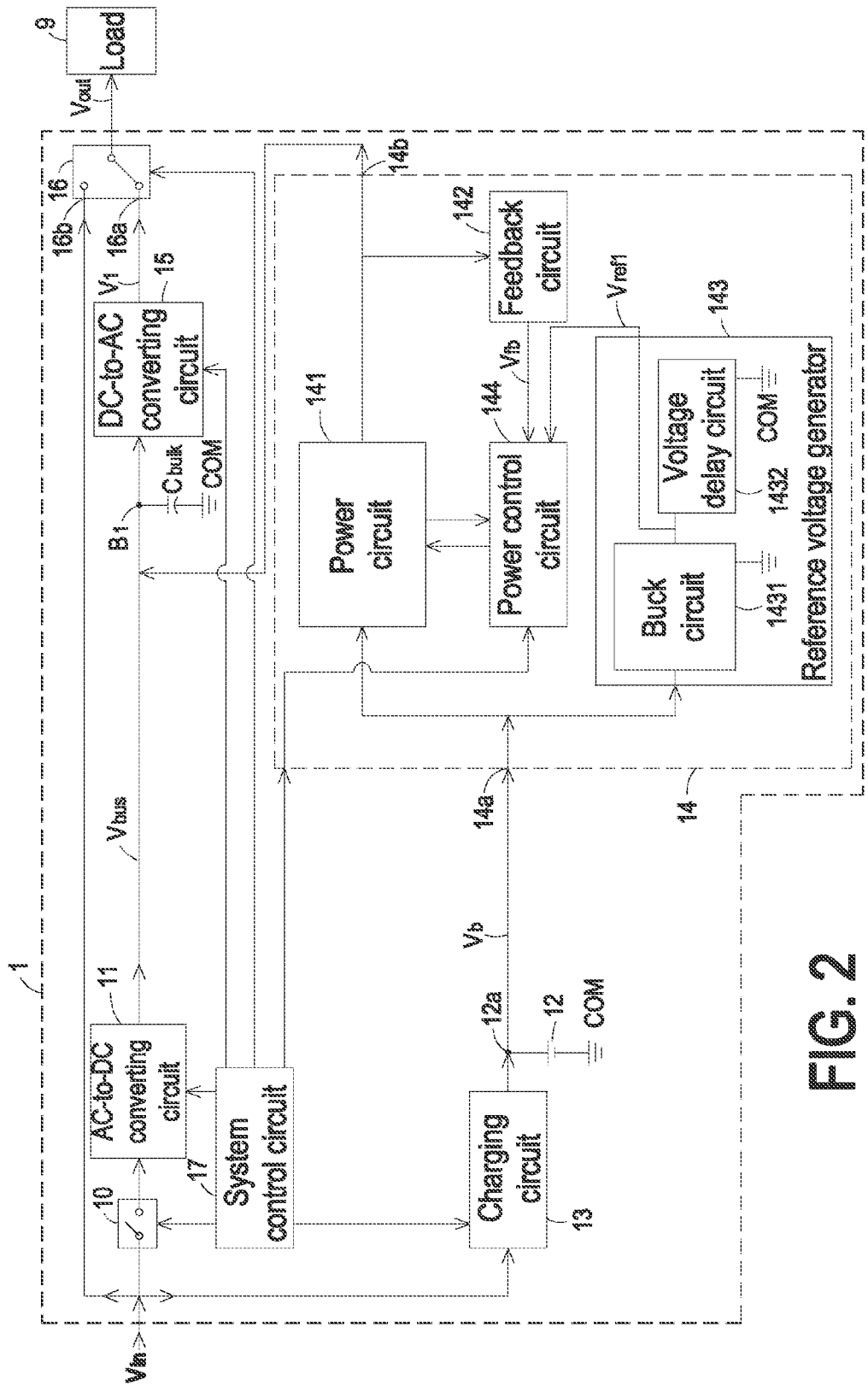
FIG. 2 is a schematic detailed circuit block diagram illustrating the uninterruptible power supply shown in FIG. 1.

FIG. 2 is a schematic detailed circuit block diagram illustrating the uninterruptible power supply shown in FIG. 1. The DC-to-DC converting circuit 14 comprises a power circuit 141, a feedback circuit 142, a reference voltage generator 143 and a power control circuit 144. The input terminal and the output terminal of the power circuit 141 are respectively connected to the power input terminal 14a and the power output terminal 14b of the DC-to-DC converting circuit 14. The control terminal of the power circuit 141 is connected to the power control circuit 144. Under control of the power control circuit 144, the energy storage unit connecting node voltage $V_b$ is converted into the regulated DC voltage, which is equal to the bus voltage $V_{bus}$. The input terminal of the feedback circuit 142 is connected to the output terminal of the power circuit 141. The output terminal of the feedback circuit 142 is connected to the feedback terminal of the power control circuit 144. According to the bus voltage $V_{bus}$, the feedback circuit 142 generates a feedback voltage $V_{fb}$.

The input terminal of the reference voltage generator 143 is connected to the power input terminal 14a of the DC-to-DC converting circuit 14. The output terminal of the reference voltage generator 143 is connected to the power control circuit 144 for issuing a first reference voltage $V_{ref1}$. After the uninterruptible power supply apparatus 1 is initiated, the magnitude of the first reference voltage $V_{ref1}$ is gradually increased from zero volt. When the uninterruptible power supply apparatus 1 has been initiated for a delay time $t_d$, the magnitude of the first reference voltage $V_{ref1}$ reaches a predetermined value (e.g. 3 volts).

The reference voltage generator 143 comprises a buck circuit 1431 and a voltage delay circuit 1432. The input terminal of the buck circuit 1431 is connected to the input terminal of the reference voltage generator 143. In other words, the input terminal of the buck circuit 1431 is connected to the energy storage unit connecting node 12a through the power input terminal 14a of the DC-to-DC converting circuit 14. The output terminal of the buck circuit 1431 is connected to the power control circuit 144 and the voltage delay circuit 1432. By the buck circuit 1431, the energy storage unit connecting node voltage $V_b$ is decreased to the first reference voltage $V_{ref1}$. The voltage delay circuit 1432 is interconnected between the output terminal of the buck circuit 1431 and the common terminal COM. By the voltage delay circuit 1432, the magnitude of the first reference voltage $V_{ref1}$ is increased from zero volt to the predetermined value after the uninterruptible power supply apparatus 1 has been initiated for a delay time $t_d$.

The input terminal of the input terminal of the reference voltage generator 143 is connected to the power input terminal 14a of the DC-to-DC converting circuit 14. The energy storage unit connecting node voltage $V_b$ is inputted into the power input terminal 14a of the DC-to-DC converting circuit 14 and then converted into the first reference voltage $V_{ref1}$ by the reference voltage generator 143. In some embodiments, the input terminal of the reference voltage generator 143 is connected to other components of the uninterruptible power supply apparatus 1. For example, the input terminal of the reference voltage generator 143 may be connected to the DC bus $B_1$, and the bus voltage $V_{bus}$ is converted into the first reference voltage $V_{ref1}$ by the reference voltage generator 143.

Figure 3A:
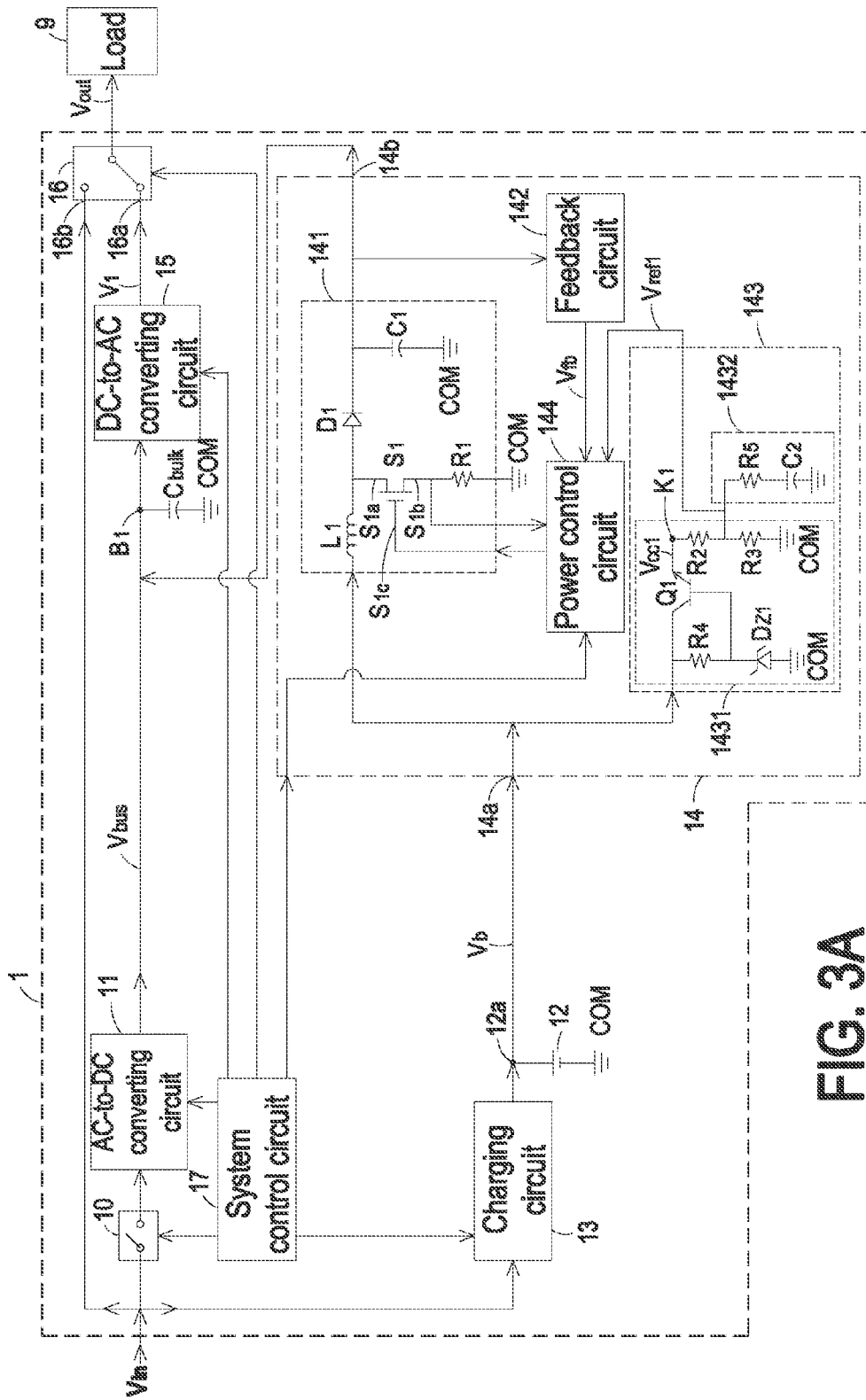
FIG. 3A is a schematic detailed circuit block diagram illustrating the DC-to-DC converting circuit of the uninterruptible power supply shown in FIG. 2.

The power control circuit 144 is connected to the system control circuit 17, the feedback circuit 142, the reference voltage generator 143, the first switch element $S_1$ and the first resistor $R_1$ of the power circuit 141 (as shown in FIG. 3A). According to the voltage difference between the first reference voltage $V_{ref1}$ and the feedback voltage $V_{fb}$, the power control circuit 144 controls the on/off statuses of the first switch element $S_1$ of the power circuit 141. As a consequence, the regulated DC voltage issued from the DC-to-DC converting circuit 14 is equal to the bus voltage $V_{bus}$. The feedback voltage $V_{fb}$ is generated according to the regulated DC voltage issued from the DC-to-DC converting circuit 14. In a case that the regulated DC voltage issued from the DC-to-DC converting circuit 14 is altered, the voltage difference between the first reference voltage $V_{ref1}$ and the feedback voltage $V_{fb}$ will be changed. In other words, the power control circuit 144 will dynamically control the operating condition of the first switch element $S_1$ so as to issue a stable regulated DC voltage from the DC-to-DC converting circuit 14. In some embodiments, the operating condition of the first switch element $S_1$ is controlled by for example adjusting the duty cycle of the first switch element $S_1$ through pulse width modulation (PWM).

During operation of the DC-to-DC converting circuit 14, the power control circuit 144 will dynamically control the operating condition of the first switch element $S_1$ such that the voltage difference between the first reference voltage $V_{ref1}$ and the feedback voltage $V_{fb}$ is adjusted to be zero volt. Under this circumstance, the first reference voltage $V_{ref1}$ is equal to the feedback voltage $V_{fb}$. Moreover, the feedback voltage $V_{fb}$ is in direct proportion to the regulated DC voltage issued from the DC-to-DC converting circuit 14. In other words, the magnitude of the feedback voltage $V_{fb}$ corresponds to a specified voltage value of the regulated DC voltage issued from the DC-to-DC converting circuit 14.

According to a specific design, the rated voltage value of the regulated DC voltage issued from the DC-to-DC converting circuit 14 is adjustable by changing the magnitude of the first reference voltage $V_{ref1}$. For example, in a case that the magnitude of the first reference voltage $V_{ref1}$ is 3 volts, the rated voltage value of the regulated DC voltage is 150 volts. During operation of the DC-to-DC converting circuit 14, the power control circuit 144 will dynamically control the operating condition of the first switch element $S_1$ such that the voltage difference between the first reference voltage $V_{ref1}$ and the feedback voltage $V_{fb}$ is adjusted to be zero volt. That is, the magnitude of the feedback voltage $V_{fb}$ is also 3 volts. Since the feedback voltage $V_{fb}$ is in direct proportion to the regulated DC voltage issued from the DC-to-DC converting circuit 14, the rated voltage value of the regulated DC voltage is 150 volts. On the other hand, if the first reference voltage $V_{ref1}$ generated by the reference voltage generator 143 is 1 volt, the power control circuit 144 will dynamically control the operating condition of the first switch element $S_1$ such that the magnitude of the feedback voltage $V_{fb}$ is also 1 volt and the rated voltage value of the regulated DC voltage is changed to 50 volts.

FIG. 3A is a schematic detailed circuit block diagram illustrating the DC-to-DC converting circuit of the uninterruptible power supply shown in FIG. 2. As shown in FIG. 2 and FIG. 3A, the power circuit 141 of the DC-to-DC converting circuit 14 comprises a first inductor $L_1$, a first diode $D_1$, a first capacitor $C_1$, a first switch element $S_1$ and the first resistor $R_1$. An end of the first inductor $L_1$ is connected to the positive end of the first diode $D_1$ and a first terminal $S_{1a}$ of the first switch element $S_1$. The other end of the first inductor $L_1$ is connected to the power input terminal 14a of the DC-to-DC converting circuit 14 to store electric energy and step up the voltage. The positive end of the first diode $D_1$ is connected to the first inductor $L_1$ and the first terminal $S_{1a}$ of the first switch element $S_1$. The negative end of the first diode $D_1$ is connected to the power output terminal 14b of the DC-to-DC converting circuit 14 and the first capacitor $C_1$. The first diode $D_1$ is used for limiting the current-flowing direction. The first capacitor $C_1$ is interconnected between the power output terminal 14b of the DC-to-DC converting circuit 14 and the common terminal COM for filtering off noise. The first terminal $S_{1a}$ of the first switch element $S_1$ is connected to the first inductor $L_1$ and the positive end of the first diode $D_1$. The control terminal $S_{1c}$ of the first switch element $S_1$ is connected to the power control circuit 144. The second terminal $S_{1b}$ of the first switch element $S_1$ is connected to an end of the first resistor $R_1$. The other end of the first resistor $R_1$ is connected to the common terminal COM. The first resistor $R_1$ is used for detecting a charging current flowing through the first inductor $L_1$. Under control of the power control circuit 144, the first switch element $S_1$ is conducted or shut off, so that electric energy is charged into the first inductor $L_1$ or the first inductor $L_1$ discharges the stored electric energy. As a result, the energy storage unit connecting node voltage $V_b$ can be converted into a regulated DC voltage having the magnitude equal to the bus voltage $V_{bus}$.

The buck circuit 1431 of the reference voltage generator 143 comprises a second resistor $R_2$, a third resistor $R_3$, a fourth resistor $R_4$, a first transistor $Q_1$ and a first Zener diode $D_{z1}$. An end of the second resistor $R_2$ is connected to a first connecting node $K_1$. The other end of the second resistor $R_2$ is connected to an end of the third resistor $R_3$, the power control circuit 144 and the voltage delay circuit 1432. The other end of the third resistor $R_3$ is connected to the common terminal COM. The fourth resistor $R_4$ is connected to the base and the collector of the first transistor $Q_1$. The emitter of the first transistor $Q_1$ is connected to the first connecting node $K_1$. The collector of the first transistor $Q_1$ is connected to the input terminal of the reference voltage generator 143. The first Zener diode $D_{z1}$ is connected to the base of the first transistor $Q_1$ and the common terminal COM. The energy storage unit connecting node voltage $V_b$ is processed by the fourth resistor $R_4$, the first transistor $Q_1$ and the first Zener diode $D_{z1}$, thereby generating a stable and constant first auxiliary voltage $V_{cc1}$ (e.g. 5 volts) at the first connecting node $K_1$. The first auxiliary voltage $V_{cc1}$ is subject to voltage division by the second resistor $R_2$ and the third resistor $R_1$, thereby generating the first reference voltage $V_{ref1}$.

The voltage delay circuit 1432 of the reference voltage generator 143 comprises a second capacitor $C_2$ and a fifth resistor $R_5$. The second capacitor $C_2$ and the fifth resistor $R_5$ are connected between the output terminal of the buck circuit 1431 and the common terminal COM in series. By the voltage delay circuit 1432, the magnitude of the first reference voltage $V_{ref1}$ is increased from zero volt to the predetermined value (e.g. 3 volts) after the uninterruptible power supply apparatus 1 has been initiated for a delay time $t_d$.

Figure 3B:
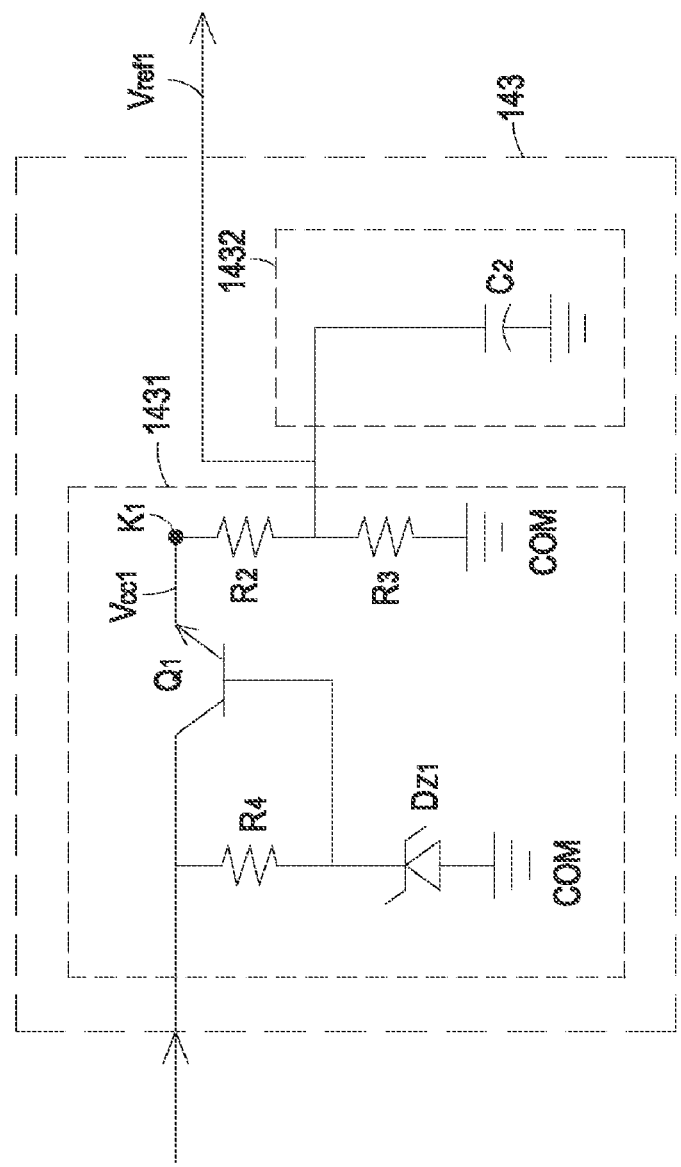
FIG. 3B is a schematic circuit diagram illustrating a variation of the reference voltage generator shown in FIG. 3A.

FIG. 3B is a schematic circuit diagram illustrating a variation of the reference voltage generator shown in FIG. 3A. In FIG. 3A, the delay time $t_d$ is determined by the second resistor $R_2$, the fifth resistor $R_5$ and the second capacitor $C_2$. In a case that the delay time $t_d$ is sufficient, the fifth resistor $R_5$ may be omitted. As shown in FIG. 3B, the voltage delay circuit 1432 of the reference voltage generator 143 is only composed of the second capacitor $C_2$. The second capacitor $C_2$ is connected between the output terminal of the buck circuit 1431 and the common terminal COM.

Figure 4:
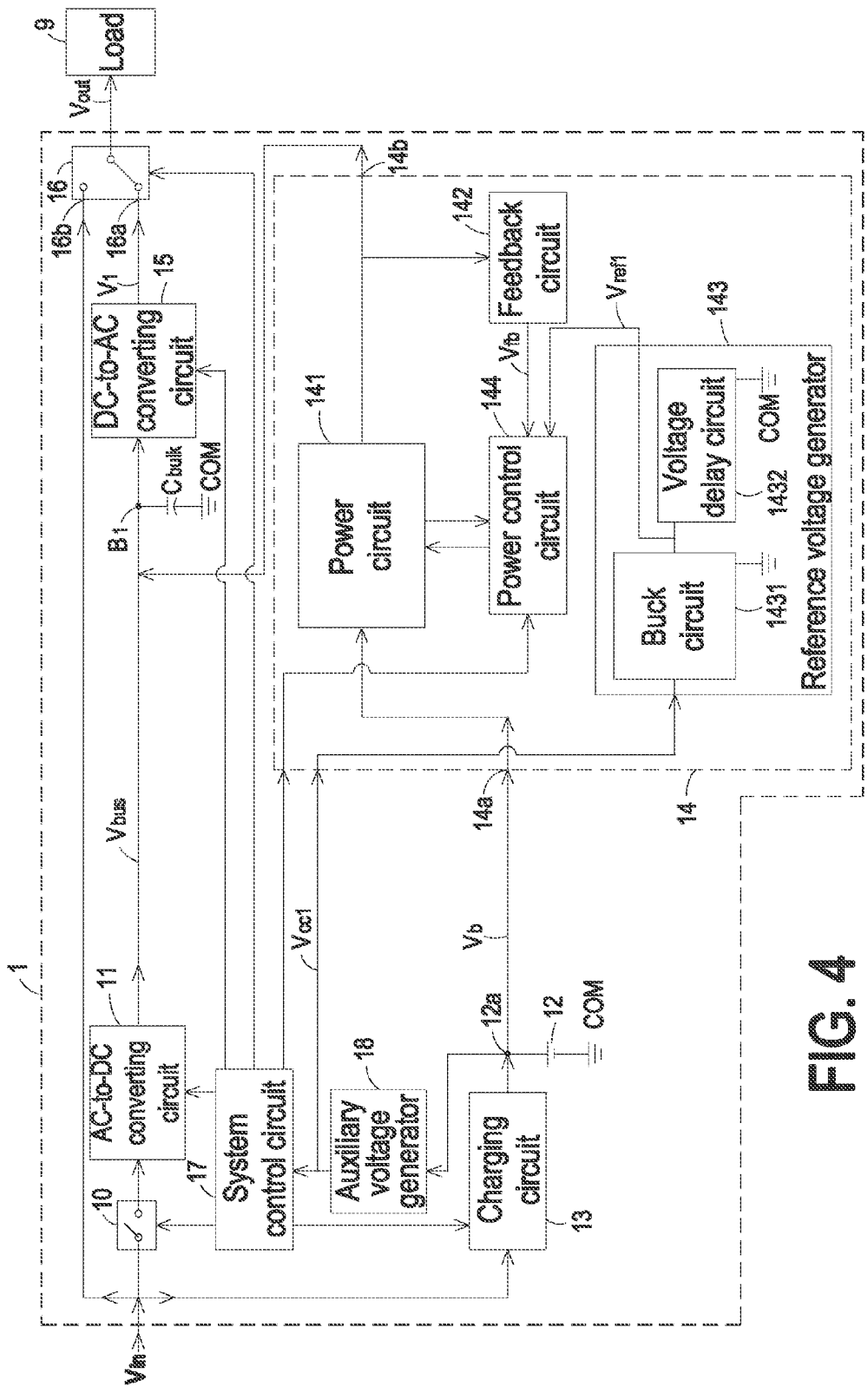
FIG. 4 is a schematic circuit diagram of an uninterruptible power supply according to a second preferred embodiment of the present invention.

FIG. 4 is a schematic circuit diagram of an uninterruptible power supply according to a second preferred embodiment of the present invention. The configurations and the operation principles of the input switching circuit 10, the AC-to-DC converting circuit 11, the bus capacitor $C_{bulk}$, the energy storage unit 12, the charging circuit 13, the DC-to-DC converting circuit 14, the DC-to-AC converting circuit 15, the selection circuit 16 and the system control circuit 17 included in this embodiment are similar to those shown in FIG. 2, and are not redundantly described herein. In contrast, the uninterruptible power supply 1 of FIG. 4 further comprises an auxiliary voltage generator 18. The output terminal of the auxiliary voltage generator 18 is connected to the input terminal of the reference voltage generator 143. The auxiliary voltage generator 18 is used for generating a first auxiliary voltage $V_{cc1}$. According to the first auxiliary voltage $V_{cc1}$, the reference voltage generator 143 outputs the first reference voltage $V_{ref1}$.

The auxiliary voltage generator 18 is interconnected between the reference voltage generator 143 and the energy storage unit connecting node 12a. The output terminal of the auxiliary voltage generator 18 is further connected to the power terminal of the system control circuit 17 and the power terminal of the power control circuit 144 of the DC-to-DC converting circuit 14 (not shown). By the auxiliary voltage generator 18, the energy storage unit connecting node voltage $V_b$ is converted into the first auxiliary voltage $V_{cc1}$. The first auxiliary voltage $V_{cc1}$ may be provided to the reference voltage generator 143, the power control circuit 144 (not shown) and the system control circuit 17.

Moreover, in the uninterruptible power supply 1 of FIG. 2, the energy storage unit connecting node voltage $V_b$ is directly converted into the first reference voltage $V_{ref1}$ by the reference voltage generator 143. Whereas, in the uninterruptible power supply 1 of FIG. 4, the first reference voltage $V_{ref1}$ is generated by the reference voltage generator 143 according to the first auxiliary voltage $V_{cc1}$, and the energy storage unit connecting node voltage $V_b$ is converted into the first auxiliary voltage $V_{cc1}$ by the auxiliary voltage generator 18. In other words, the energy storage unit connecting node voltage $V_b$ is indirectly used to generate the first reference voltage $V_{ref1}$ by the reference voltage generator 143.

Figure 5:
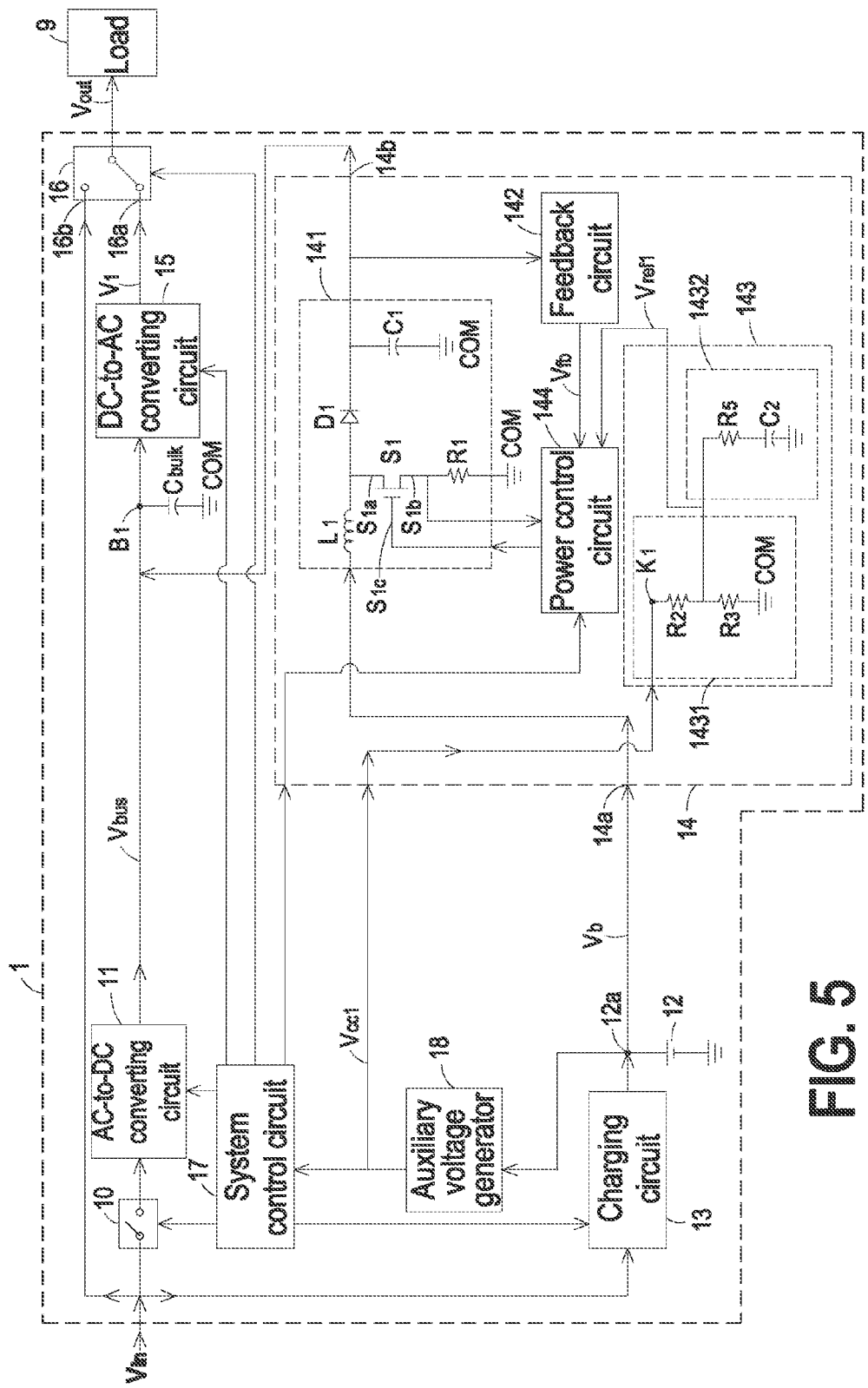
FIG. 5 is a schematic detailed circuit block diagram illustrating the uninterruptible power supply shown in FIG. 4.

FIG. 5 is a schematic detailed circuit block diagram illustrating the uninterruptible power supply shown in FIG. 4. The configurations and the operation principles of the power circuit 141, the feedback circuit 142 and the power control circuit 144 included in the DC-to-DC converting circuit 14 of this embodiment are similar to those shown in FIG. 3A, and are not redundantly described herein. In contrast, the input terminal of the reference voltage generator 143 of the DC-to-DC converting circuit 14 is connected to the output terminal of the auxiliary voltage generator 18. In particular, the buck circuit 1431 of the reference voltage generator 143 is connected to the output terminal of the auxiliary voltage generator 18. The buck circuit 1431 of the reference voltage generator 143 only comprises the second resistor $R_2$ and the third resistor $R_3$, which are connected in series. An end of second resistor $R_2$ is connected to the output terminal of the auxiliary voltage generator 18 through the first connecting node $K_1$. The other end of the second resistor $R_2$ is connected to the power control circuit 144 and the voltage delay circuit 1432. An end of the third resistor $R_3$ is connected to the other end of the second resistor $R_2$, the power control circuit 144 and the voltage delay circuit 1432. The other end of the third resistor $R_3$ is connected to the common terminal COM. The output terminal of the auxiliary voltage generator 18 is connected to the first connecting node $K_1$. The energy storage unit connecting node voltage $V_b$ is processed by the auxiliary voltage generator 18, thereby generating a stable and constant first auxiliary voltage $V_{cc1}$ (e.g. 5 volts) at the first connecting node $K_1$. The first auxiliary voltage $V_{cc1}$ is subject to voltage division by the second resistor $R_2$ and the third resistor $R_3$, thereby generating the first reference voltage $V_{ref1}$. Likewise, by the voltage delay circuit 1432, the magnitude of the first reference voltage $V_{ref1}$ is increased from zero volt to the predetermined value (e.g. 3 volts) after the uninterruptible power supply apparatus 1 has been initiated for a delay time $t_d$.

Figure 6:
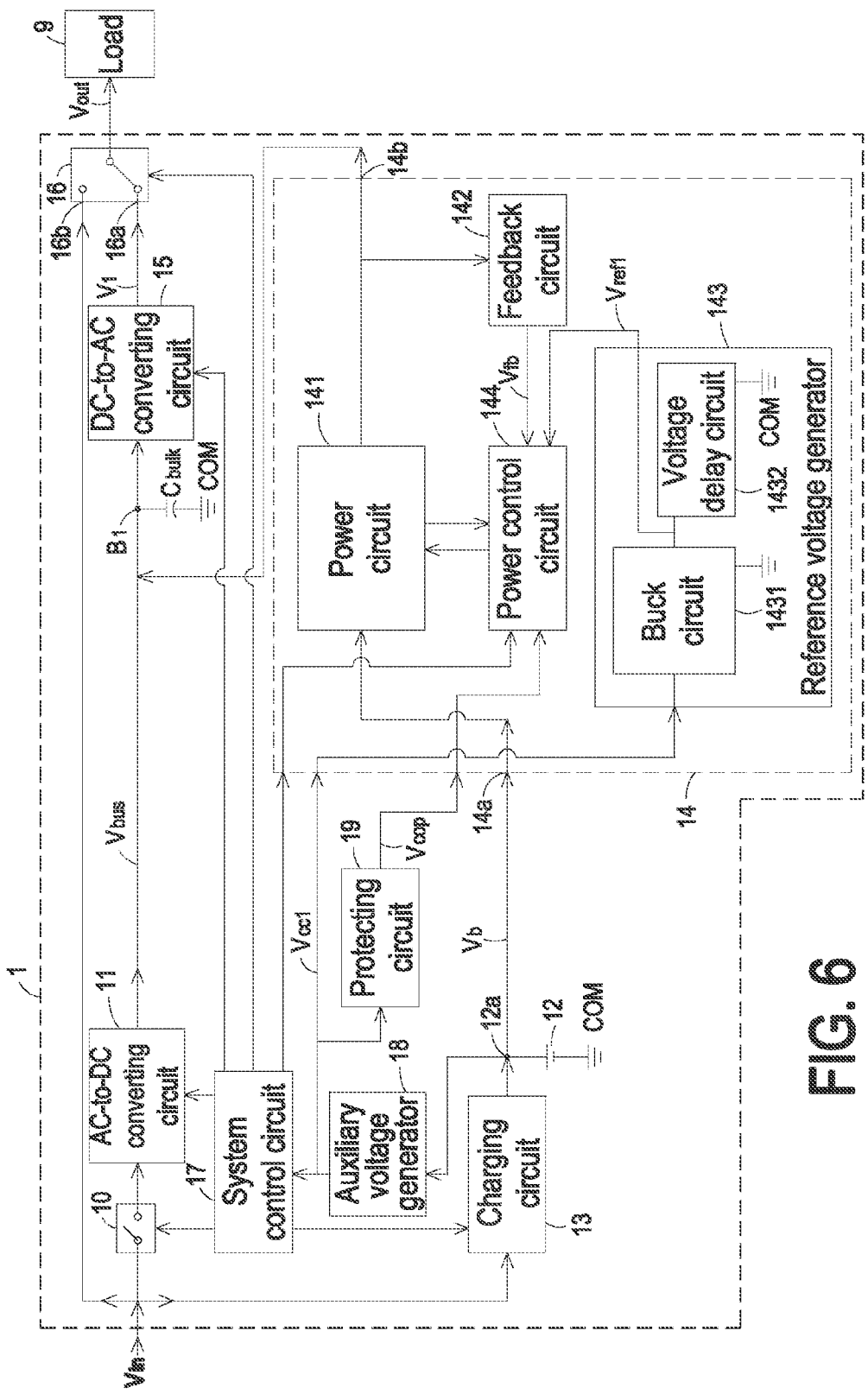
FIG. 6 is a schematic circuit diagram of an uninterruptible power supply according to a third preferred embodiment of the present invention.

FIG. 6 is a schematic circuit diagram of an uninterruptible power supply according to a third preferred embodiment of the present invention. The configurations and the operation principles of the input switching circuit 10, the AC-to-DC converting circuit 11, the bus capacitor $C_{bulk}$, the energy storage unit 12, the charging circuit 13, the DC-to-DC converting circuit 14, the DC-to-AC converting circuit 15, the selection circuit 16, the system control circuit 17 and the auxiliary voltage generator 18 included in this embodiment are similar to those shown in FIG. 4, and are not redundantly described herein. In contrast, the uninterruptible power supply 1 of FIG. 6 further comprises a protecting circuit 19. The protecting circuit 19 is interconnected between the auxiliary voltage generator 18 and the power control circuit 144 of the DC-to-DC converting circuit 14. According to the first auxiliary voltage $V_{cc1}$ generated by the auxiliary voltage generator 18, the protecting circuit 19 generates a protecting signal $V_{cop}$. In response to the protecting signal $V_{cop}$, the DC-to-DC converting circuit 14 stops outputting electric energy. Under this circumstance, the electric energy fed into the energy storage unit connecting node 12a is decreased and the possibility of burning out the charging circuit 13 is minimized. In addition, since the first auxiliary voltage $V_{cc1}$ is not low enough, the uninterruptible power supply apparatus 1 can be normally operated.

Figure 7:
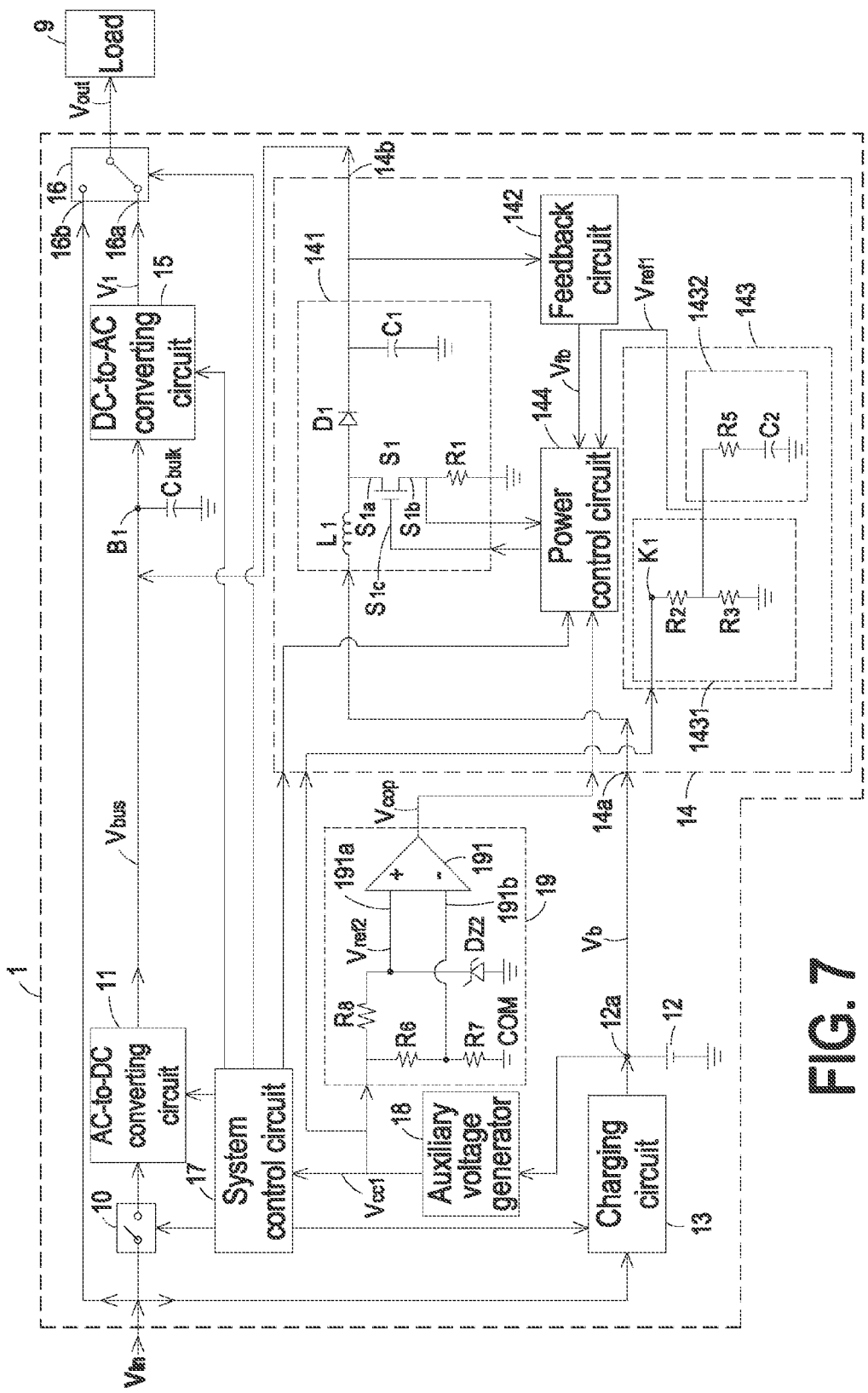
FIG. 7 is a schematic detailed circuit block diagram illustrating the uninterruptible power supply shown in FIG. 6.

FIG. 7 is a schematic detailed circuit block diagram illustrating the uninterruptible power supply shown in FIG. 6. The configurations and the operation principles of the input switching circuit 10, the AC-to-DC converting circuit 11, the bus capacitor $C_{bulk}$, the energy storage unit 12, the charging circuit 13, the DC-to-DC converting circuit 14, the DC-to-AC converting circuit 15, the selection circuit 16, the system control circuit 17 and the auxiliary voltage generator 18 included in this embodiment are similar to those shown in FIG. 5, and are not redundantly described herein. In contrast, the uninterruptible power supply 1 of FIG. 7 further comprises a protecting circuit 19. As shown in FIG. 7, the protecting circuit 19 comprises a comparator 191, a sixth resistor $R_6$, a seventh resistor $R_7$, an eighth resistor $R_8$ and a second Zener diode $D_{z2}$. An end of the sixth resistor $R_6$ is connected to the output terminal of the auxiliary voltage generator 18. The other end of the sixth resistor $R_6$ is connected to the second input terminal 191b of the comparator 191. The seventh resistor $R_7$ is interconnected between the second input terminal 191b of the comparator 191 and the common terminal COM. An end of the eighth resistor $R_8$ is connected to the output terminal of the auxiliary voltage generator 18. The other end of the eighth resistor $R_8$ is connected to the first input terminal 191a of the comparator 191. The second Zener diode $D_{z2}$ is interconnected between the first input terminal 191a of the comparator 191 and the common terminal COM. The output terminal of the comparator 191 is connected to the power control circuit 144 of the DC-to-DC converting circuit 14. By comparing the voltage inputted into the first input terminal 191a with the voltage inputted into the second input terminal 191b, the output terminal of the comparator 191 generates a protecting signal $V_{cop}$.

As shown in FIG. 7, the second Zener diode $D_{z2}$ generates a second reference voltage $V_{ref2}$ to the first input terminal 191a of the comparator 191. The first auxiliary voltage $V_{cc1}$ is subject to voltage division by the sixth resistor $R_6$ and the seventh resistor $R_7$, and then inputted to the second input terminal 191b of the comparator 191. If excessive electric energy is transmitted from the energy storage unit connecting node 12a to the input terminal of the DC-to-DC converting circuit 14 when the uninterruptible power supply 1 is initiated, the energy storage unit connecting node voltage $V_b$ will be decreased. In addition, the first auxiliary voltage $V_{cc1}$ and voltage inputted into the second input terminal 191b of the comparator 191 are also decreased.

If the energy storage unit connecting node voltage $V_b$ and the first auxiliary voltage $V_{cc1}$ are too low (for example lower than a threshold value), the voltage inputted into the second input terminal 191b of the comparator 191 is lower than the second reference voltage $V_{ref2}$ that is inputted into the first input terminal 191a of the comparator 191. At the same time, the protecting signal $V_{cop}$ is switched from an enabling state (e.g. a low-voltage level) to a disabling state (e.g. a high-voltage level), so that the operation of the DC-to-DC converting circuit 14 is suspended.

Figure 8:
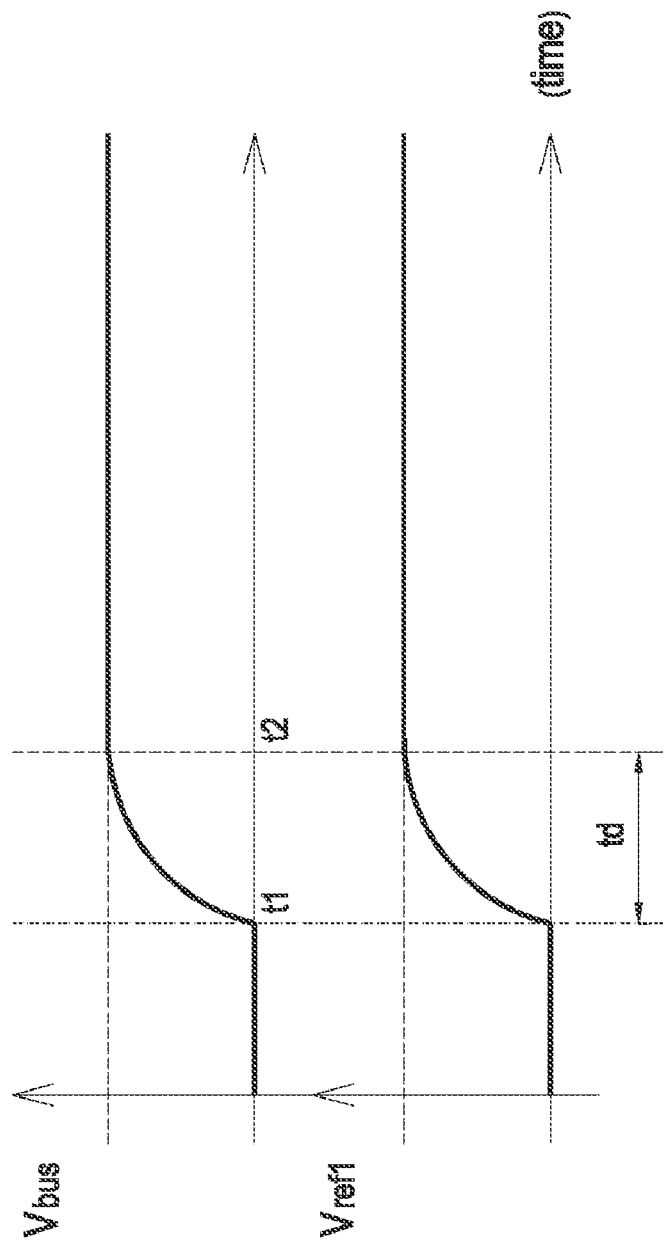
FIG. 8 is a timing waveform diagram schematically illustrating the corresponding voltage signals processed in the uninterruptible power supply of the present invention.

FIG. 8 is a timing waveform diagram schematically illustrating the corresponding voltage signals processed in the uninterruptible power supply of the present invention. Please refer to FIGS. 1-8.

Before the time spot $t_1$, the uninterruptible power supply 1 has not been initiated, the bus voltage $V_{bus}$ and the first reference voltage $V_{ref1}$ are both zero volt.

At the time spot $t_1$, the uninterruptible power supply 1 is initiated, the input switching circuit 10 is shut off and the charging circuit 13 and the DC-to-DC converting circuit 14 are enabled under control of the system control circuit 17. In addition, the magnitude of the first reference voltage $V_{ref1}$ is gradually increased from zero volt and the bus capacitor $C_{bulk}$ is charged by the DC-to-DC converting circuit 14. Meanwhile, the bus voltage $V_{bus}$ is zero. Since the first reference voltage $V_{ref1}$ is zero at the time spot $t_1$, the voltage difference between the first reference voltage $V_{ref1}$ and the feedback voltage $V_{fb}$ is also zero. In other words, the first switch element $S_1$ is operated at a lower duty cycle under control of the power control circuit 144 of the DC-to-DC converting circuit 14, so that the current generated by the bus capacitor $C_{bulk}$ is not large enough and the input current of the uninterruptible power supply 1 is not large enough.

Before the time spot $t_1$ and the time spot $t_2$, the input switching circuit 10 is continuously shut off and the charging circuit 13 and the DC-to-DC converting circuit 14 are enabled under control of the system control circuit 17. In addition, the bus capacitor $C_{bulk}$ is continuously charged by the DC-to-DC converting circuit 14. Since the magnitude of the first reference voltage $V_{ref1}$ is gradually increased, the bus voltage $V_{bus}$ is also gradually increased. Under this circumstance, the voltage difference between the first reference voltage $V_{ref1}$ and the feedback voltage $V_{fb}$ is not too large. In other words, the first switch element $S_1$ is operated at a lower duty cycle under control of the power control circuit 144 of the DC-to-DC converting circuit 14, so that the current generated by the bus capacitor $C_{bulk}$ is not large enough and the input current of the uninterruptible power supply 1 is not large enough.

At the time spot $t_2$, the bus voltage $V_{bus}$ and the first reference voltage $V_{ref1}$ reach the rated voltage values, the input switching circuit 10 is conducted and the AC-to-DC converting circuit 11 is enabled under control of the system control circuit 17. At the same time, the energy storage unit 12 is charged by the charging circuit 13 according to the charge capacity of the energy storage unit 12, the DC-to-DC converting circuit 14 is disabled, the DC-to-AC converting circuit 15 is enabled, and the first AC voltage $V_1$ is transmitted to the load 9 through the selection circuit 16.

After the time spot $t_2$, the uninterruptible power supply 1 has been fully initiated. Meanwhile, the operation modes of the uninterruptible power supply 1 are adjustable by the system control circuit 17. For example, in a direct supply mode, the input AC voltage $V_{in}$ is directly transmitted to the load 9 through selection circuit 16. Whereas, in a back-up mode, the electric energy stored in the energy storage unit 12 is transmitted to the load 9 through the DC-to-DC converting circuit 14, the DC-to-AC converting circuit 15 and the selection circuit 16.

Figure 9:
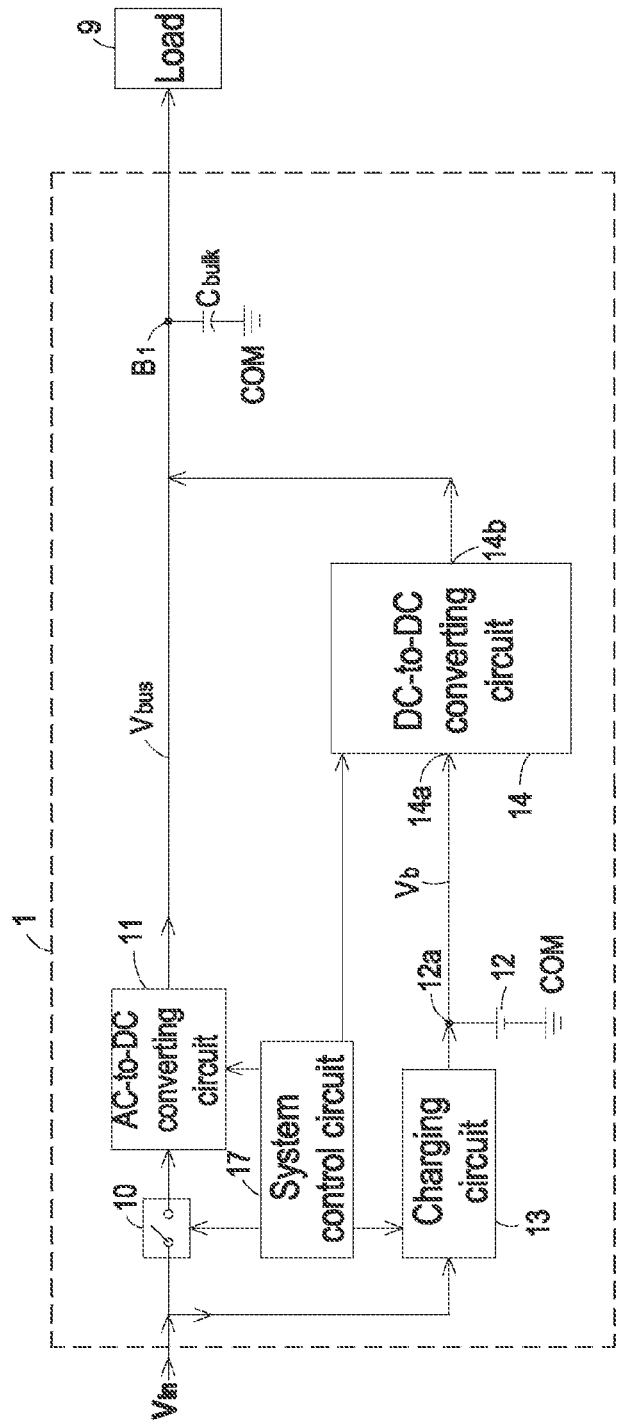
FIG. 9 is a schematic circuit diagram of an uninterruptible power supply according to a fourth preferred embodiment of the present invention.

FIG. 9 is a schematic circuit diagram of an uninterruptible power supply according to a fourth preferred embodiment of the present invention. As shown in FIG. 9, the uninterruptible power supply apparatus 1 principally comprises an input switching circuit 10, an AC-to-DC converting circuit 11, a bus capacitor $C_{bulk}$, an energy storage unit 12, a charging circuit 13, a DC-to-DC converting circuit 14, and a system control circuit 17. In comparison with the uninterruptible power supply of FIG. 1, the DC-to-AC converting circuit 15 and the selection circuit 16 are excluded. In addition, the load 9 is directly connected to the DC bus $B_1$ and the electric energy of the bus voltage $V_{bus}$ is directly transmitted to the load 9. In this embodiment, the DC voltage is used for powering the load 9. Alternatively, in a case that an AC voltage is used for powering the load 9, an additional DC-to-DC converting circuit (not shown) is arranged between the DC bus $B_1$ and the load 9 for converting the bus voltage $V_{bus}$ into the first AC voltage.

As previously described, the process of using the AC-to-DC converting circuit to charge the bus capacitor is unsatisfactory. In contrast, by using the DC-to-DC converting circuit to charge the bus capacitor according to the present invention, the rated voltage value of the regulated DC voltage issued from the DC-to-DC converting circuit can be dynamically adjusted when the uninterruptible power supply is initiated. Since the magnitudes of the charging current and the input current are both reduced, the initiation current of the uninterruptible power supply is reduced and no inrush current is generated. Moreover, no thermistor is used for controlling the initiation current, and thus the power consumption is reduced. Since the complicated and instable phase control circuit is no longer used, the uninterruptible power supply of the present invention is capable of accurately reducing the initiation current and has enhanced overall stability.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An uninterruptible power supply comprising:
   an input switching circuit receiving an input AC voltage;
   an AC-to-DC converting circuit interconnected between said input switching circuit and a DC bus for converting said input AC voltage into a bus voltage;
   a bus capacitor connected to said DC bus;
   an energy storage unit having an end selectively connected to an energy storage unit connecting node and the other end connected to a common terminal for storing electric energy;
   a charging circuit connected to said input switching circuit and said energy storage unit connecting node for charging said energy storage unit;
   a DC-to-DC converting circuit connected to said energy storage unit connecting node and said DC bus for converting said energy storage unit connecting node voltage into a regulated DC voltage; and
   a system control circuit connected to said input switching circuit, said AC-to-DC converting circuit, said charging circuit and said DC-to-DC converting circuit for controlling operations of said uninterruptible power supply, wherein when said uninterruptible power supply is initiated, said AC-to-DC converting circuit is disabled and said bus capacitor is charged by said DC-to-DC converting circuit under control of said system control circuit.

2. The uninterruptible power supply according to claim 1 wherein a rated voltage value of said regulated DC voltage issued from said DC-to-DC converting circuit is dynamically adjusted when said uninterruptible power supply is initiated.

3. The uninterruptible power supply according to claim 1 further comprising a DC-to-AC converting circuit, which is interconnected between said DC bus and a load, for converting said bus voltage into a first AC voltage.

4. The uninterruptible power supply according to claim 3 further comprising a selection circuit interconnected between said DC-to-AC converting circuit, said input switching circuit and said load, wherein a first input terminal, a second input terminal, an output terminal and a control terminal of said selection circuit are respectively connected to an output terminal of said DC-to-AC converting circuit, an input terminal of said input switching circuit, said load and said system control circuit, and said first AC voltage or said input AC voltage is transmitted to said load through said selection circuit.

5. The uninterruptible power supply according to claim 1 wherein said DC-to-DC converting circuit comprises:
   a power circuit interconnected between said energy storage unit connecting node and said DC bus for converting said energy storage unit connecting node voltage into said regulated DC voltage, which has the same voltage magnitude as said bus voltage;
   a feedback circuit connected to an output terminal of said power circuit and generating a feedback voltage according to said bus voltage;
   a reference voltage generator for generating a first reference voltage, wherein the magnitude of said first reference voltage reaches a predetermined value after said uninterruptible power supply apparatus has been initiated for a delay time; and
   a power control circuit connected to said power circuit, said feedback circuit and said reference voltage generator for controlling operations of said power circuit according to said first reference voltage and said feedback voltage.

6. The uninterruptible power supply according to claim 5 wherein the magnitude of said first reference voltage reaches said predetermined value after said uninterruptible power supply apparatus has been initiated for said delay time, so that said rated voltage value of said regulated DC voltage issued from said DC-to-DC converting circuit is dynamically adjusted.

7. The uninterruptible power supply according to claim 5 wherein said power circuit comprises:
   a first inductor having an end connected to a power input terminal of said DC-to-DC converting circuit for storing electric energy and stepping up the voltage across said first inductor;
   a first diode having a positive end connected to said first inductor and a negative end connected to a power output terminal of said DC-to-DC converting circuit for limiting the current-flowing direction;
   a first capacitor interconnected between said power output terminal of said DC-to-DC converting circuit and said common terminal for filtering off noise;
   a first switch element having first terminal connected to said first inductor and said positive end of said first diode and a control terminal connected to said power control circuit; and
   a first resistor having an end connected to a second terminal of said first switch element and the other end connected to said common terminal for detecting a charging current flowing through said first inductor,
   wherein said first switch element is conducted or shut off according to said first reference voltage and said feedback voltage under control of said power control circuit, so that electric energy is charged into said first inductor or said first inductor discharges the stored electric energy and said energy storage unit connecting node voltage is converted into said regulated DC voltage having the same magnitude as said bus voltage.

8. The uninterruptible power supply according to claim 5 wherein said reference voltage generator comprises:
   a buck circuit connected to an input terminal of said reference voltage generator and said power control circuit for generating said first reference voltage; and
   a voltage delay circuit connected to an output terminal of said buck circuit and said common terminal, so that the magnitude of said first reference voltage reaches said predetermined value after said uninterruptible power supply apparatus has been initiated for said delay time.

9. The uninterruptible power supply according to claim 8 wherein said voltage delay circuit comprises a second capacitor, which is interconnected between said output terminal of said buck circuit and said common terminal.

10. The uninterruptible power supply according to claim 9 wherein said voltage delay circuit further comprises a fifth resistor, which is connected with said second capacitor in series, for increasing said delay time.

11. The uninterruptible power supply according to claim 8 wherein said input terminal of said reference voltage generator is connected to said energy storage unit connecting node, an output terminal of said reference voltage generator is connected to said power control circuit, and said energy storage unit connecting node voltage is converted into said first reference voltage by said reference voltage generator.

12. The uninterruptible power supply according to claim 11 wherein said buck circuit comprises:
   a second resistor having an end connected to a first connecting node and the other end connected to said power control circuit and said voltage delay circuit;
   a third resistor having an end connected to the other end of said second resistor, said power control circuit and said voltage delay circuit and the other end connected to said common terminal;
   a first transistor having an emitter connected to said first connecting node;
   a fourth resistor interconnected between a base and a collector of said first transistor; and
   a first Zener diode interconnected between said base of said first transistor and said common terminal,
   wherein said energy storage unit connecting node voltage is processed by said fourth resistor, said first transistor and said first Zener diode to generate a first auxiliary voltage at said first connecting node, and said first auxiliary voltage is subject to voltage division by said second resistor and said third resistor to generate said first reference voltage.

13. The uninterruptible power supply according to claim 8 further comprising an auxiliary voltage generator, which is interconnected between said reference voltage generator and said energy storage unit connecting node, for generating said first auxiliary voltage.

14. The uninterruptible power supply according to claim 13 wherein said input terminal of said reference voltage generator is connected to said auxiliary voltage generator, said output terminal of said reference voltage generator is connected to said power control circuit, and said first auxiliary voltage is converted into said first reference voltage by said reference voltage generator.

15. The uninterruptible power supply according to claim 14 wherein said buck circuit comprises:
   a second resistor having an end connected to an output terminal of said auxiliary voltage generator and the other end connected to said power control circuit and said voltage delay circuit; and
   a third resistor having and end connected to the other end of said second resistor, said power control circuit and said voltage delay circuit and the other end connected to said common terminal, wherein said first auxiliary voltage is subject to voltage division by said second resistor and said third resistor to generate said first reference voltage.

16. The uninterruptible power supply according to claim 13 further comprising a protecting circuit, which is interconnected between said auxiliary voltage generator and said power control circuit of said DC-to-DC converting circuit for generating a protecting signal, wherein said DC-to-DC converting circuit stops outputting electric energy in response to said protecting signal.

17. The uninterruptible power supply according to claim 16 wherein said protecting signal is switched from an enabling state to a disabling state and transmitted to said power control circuit of said DC-to-DC converting circuit if said first auxiliary voltage is lower than a threshold value, thereby suspending operations of said DC-to-DC converting circuit.

18. The uninterruptible power supply according to claim 16 wherein said enabling state and said disabling state of said protecting signal are at a low-voltage level and a high-voltage level, respectively.

19. The uninterruptible power supply according to claim 16 wherein said protecting circuit comprises:
   a comparator having an output terminal connected to said power control circuit of said DC-to-DC converting circuit, wherein the voltages inputted into a first input terminal and a second input terminal of said comparator are compared, thereby generating said protecting signal;
   a sixth resistor having an end connected to an output terminal of said auxiliary voltage generator and the other end connected to said second input terminal of said comparator;
   a seventh resistor interconnected between said second input terminal of said comparator and said common terminal;
   an eighth resistor having an end connected to said output terminal of said auxiliary voltage generator and the other end connected to said first input terminal of said comparator; and
   a second Zener diode interconnected between said first input terminal of said comparator and said common terminal,
   wherein said second Zener diode generates a second reference voltage to said first input terminal of said comparator, and said first auxiliary voltage is subject to voltage division by said sixth resistor and said seventh resistor and then inputted to said second input terminal of said comparator.

20. The uninterruptible power supply according to claim 19 wherein said protecting signal is switched to said disabling state if the voltage inputted into said second input terminal of said comparator is lower than the voltage inputted into said first input terminal of said comparator.

* * * * *